(12) United States Patent
Hoffmann et al.

(10) Patent No.: US 7,001,073 B2
(45) Date of Patent: Feb. 21, 2006

(54) HYDRODYNAMIC BEARING FOR A SPINDLE MOTOR

(75) Inventors: Joerg Hoffmann, Mettlach (DE); Olaf Winterhalter, Epfendorf (DE); Martin Hafen, Spaichingen (DE)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 10/376,071

(22) Filed: Feb. 28, 2003

(65) Prior Publication Data

US 2003/0174912 A1 Sep. 18, 2003

(30) Foreign Application Priority Data

| Mar. 8, 2002 | (DE) | ................................ 102 10 229 |
| Mar. 8, 2002 | (DE) | ................................ 102 10 230 |
| Jul. 19, 2002 | (DE) | ................................ 102 32 933 |
| Jul. 19, 2002 | (DE) | ................................ 102 61 952 |
| Nov. 25, 2002 | (DE) | ................................ 102 54 926 |

(51) Int. Cl.
*F16C 32/06* (2006.01)

(52) U.S. Cl. ..................................... 384/107; 384/110

(58) Field of Classification Search ............... 384/100, 384/107, 110–112; 310/90; 360/99.08, 98.07
See application file for complete search history.

(56) References Cited

U.S. PATENT DOCUMENTS

| 3,754,800 | A | * | 8/1973 | Johansson ..................... 384/110 |
| 4,934,836 | A | * | 6/1990 | Tanaka et al. ............... 384/100 |
| 5,579,188 | A | * | 11/1996 | Dunfield et al. .......... 360/99.08 |
| 5,590,003 | A | * | 12/1996 | Dunfield et al. .......... 360/98.07 |
| 5,653,540 | A | * | 8/1997 | Heine et al. ................. 384/123 |
| 5,667,309 | A | | 9/1997 | Nose |
| 5,708,520 | A | * | 1/1998 | Yoshitsugu et al. .......... 359/200 |
| 5,715,116 | A | * | 2/1998 | Moritan et al. ........... 360/99.08 |
| 5,855,437 | A | * | 1/1999 | Lee .............................. 384/110 |
| 5,873,657 | A | * | 2/1999 | Lee .............................. 384/110 |
| 6,066,903 | A | * | 5/2000 | Ichiyama ...................... 310/90 |
| 6,126,320 | A | * | 10/2000 | Ichiyama ..................... 384/112 |
| 6,217,218 | B1 | * | 4/2001 | Inoue et al. ................. 384/119 |
| 6,246,139 | B1 | * | 6/2001 | Iwaki et al. ................... 310/90 |
| 6,247,848 | B1 | * | 6/2001 | Iwaki et al. ................... 310/90 |
| 6,502,989 | B1 | * | 1/2003 | Takeuchi et al. ............ 384/100 |

FOREIGN PATENT DOCUMENTS

| DE | 4445664 | 2/1995 |
| DE | 197 57 265 | 2/1999 |
| DE | 19821601 | 3/2000 |
| JP | 2001-065551 | 3/2001 |
| WO | WO 94/29607 | 12/1994 |

OTHER PUBLICATIONS

German Search Report dated May 13, 2004.

* cited by examiner

*Primary Examiner*—Thomas R. Hannon
(74) *Attorney, Agent, or Firm*—Joel Lutzker; Anna Vishev; Schulte Roth & Zabel LLP

(57) ABSTRACT

Hydrodynamic bearing for use in a spindle motor includes a shaft, a bearing sleeve encompassing the shaft with a small radial clearance, a plurality of hydrodynamic pressure generating grooves formed on at least one of an outer surface of the shaft and an inner surface of the bearing sleeve, and a base-plate, flange or another frame element of the motor. The bearing sleeve is constructed as a single component with the frame element of the motor.

9 Claims, 3 Drawing Sheets

HYDRODYNAMIC BEARING FOR A SPINDLE MOTOR

CROSS-REFERENCE TO RELATED APPLICATIONS

This application claims all rights of priority to German Patent Application Serial No. DE 102 54 926.5, filed Mar. 8, 2002 (pending).

FIELD OF INVENTION

The invention relates to hydrodynamic bearings utilized in brushless DC motors which are used as spindle motors in disk drives.

BACKGROUND

Disc drive systems have been used in computers and other electronic devices for many years for storage of digital information. Information is recorded on concentric memory tracks of a magnetic disc medium, the actual information being stored in the form of magnetic transitions within the medium. The discs themselves are rotatably mounted on a spindle, the information being accessed by means of transducers located on a pivoting arm which moves radially over the surface of the disc. The read/write heads or transducers must be accurately aligned with the storage tracks on the disc to ensure proper reading and writing of information; thus the discs must be rotationally stable.

Electric spindle motors of the type used in disk drives conventionally rely on ball bearings to support a rotary member, such as a rotating hub, on a stationary member, such as a shaft. Ball bearings are known to wear parts, and in time increased friction will cause failure of the motor. In addition, ball bearings create debris in the form of dust or fine particles that can find their way into "clean" chambers housing the rotary magnetic disks which are driven by the motor. The mechanical friction inherent in ball bearings also generates heat, noise and vibration, all of which are undesirable in a disk drive motor.

Hydrodynamic bearings represent a considerable improvement over conventional ball bearings in spindle drive motors. In these types of systems, lubricating fluid, either gas or liquid, functions as the actual bearing surface between a stationary base or housing in the rotating spindle or rotating hub of the motor. For example, liquid lubricants comprising oil, more complex ferro-magnetic fluids or even air have been utilized in hydrodynamic bearing systems.

Hydrodynamic bearings have the advantage over ball bearings of improved running precision, greater shock resistance and lower noise generation.

Spindle motors for data carrier disks, in which a shaft fixedly mounted on a rotor has a hydrodynamic bearing system, are known in the art. A hydrodynamic bearing system according to the prior art consists, for example, of a bearing sleeve which can be enclosed at one end by a counter plate. The shaft is placed within the bearing sleeve and is enveloped in a fluid, preferably oil. Either the inner surface of the bearing sleeve or the outer surface of the shaft, a plurality of groove patterns are provided which generate radial hydrodynamic bearing pressure when the shaft is rotated.

Furthermore, hydrodynamic bearings with axial pivot bearings in low-power spindle motors are also known, in which axial bearing loads are taken up in one direction on a counter plate by supporting the bearing at the center of rotation and in which the axial counter load is generated magnetically, for example, by the interaction of the rotor and stator. These types of hydrodynamic bearings, however, have very low axial stiffness and their use, for example in hard disk drives, is problematic since such applications require axial stiffness in both axial directions. On the other hand, hydrodynamic bearings with axial pivot bearings have the advantage of very low frictional loss and consequently very low power consumption.

An example of a hydrodynamic bearing in accordance with the prior art as described above, is known from U.S. Pat. No. 4,934,836.

Hydrodynamic bearings are currently used in spindle motors for disk drives having very small dimensions, for example, in laptop computers. Spindle motors with hydrodynamic bearings for use in disk drives with small dimensions should have low power consumption, particularly when deployed in mobile, battery operated devices.

In the prior art, spindle motors with hydrodynamic bearings consist generally of a range of discrete separate components. Specifically, the bearing sleeve is non-rotatably mounted onto a flange, a baseplate, a frame, a support or suchlike of a spindle motor and the shaft is held in the bearing sleeve. In order to mount the bearing sleeve onto the flange or baseplate, these members typically feature a flange sleeve in which the bearing sleeve is non-rotatably held. The bearing sleeve and flange sleeve can be permanently connected together by bonding, welding, pressing or in any other manner.

High-precision machining and perfectly aligned assembly of the individual components are the key to the efficient and precise functioning of a hydrodynamic bearing. To construct a hydrodynamic bearing of the stated art, specific minimum wall thicknesses for the individual components are required, prescribed on the one hand by production techniques and on the other arising from the requirement for sufficient mechanical stability.

SUMMARY

It is an object of the present invention to provide a hydrodynamic bearing having minimal dimensions making it suitable for use in spindle motors for miniature disk drives.

It is another object of the present invention to provide a hydrodynamic bearing having minimal dimensions which can be produced at reasonable costs.

In accordance with the invention, the bearing sleeve and flange, baseplate or other stationary body component of the spindle motor are constructed as a single component, thus providing additional space within the motor. In the prior art, in order to maintain adequate stiffness and manufacturing purposes, a minimum wall thickness required for the bearing sleeve is approximately 1 mm. Minimum wall thickness required for the flange sleeve is 0.3 mm. Thus, the structure formed by the bearing sleeve and the flange sleeve has a total thickness of 1.3 mm. In the hydrodynamic bearing disclosed and claimed herein, it is possible to achieve a wall thickness of 1 mm or less for the bearing sleeve integrated into the flange. In practice, it is impossible to create such a wall thickness in a two-component construction for a hydrodynamic bearing having a separate bearing sleeve and receptacle for the bearing sleeve such as a flange, as outlined above.

The presently disclosed and claimed construction of a hydrodynamic bearing, allows considerable space saving in the diameter of the bearing sleeve. This increases the usability of the hydrodynamic bearing in spindle motors for very small applications.

The present hydrodynamic bearing is particularly suitable as a rotary bearing for rotors in spindle motors used in hard disk drives which have form factors of 2.5 inches, 1.8 inches and less, to power magnetic disks.

The present hydrodynamic bearing has an additional advantage being constructed with a lesser number of components than used in the prior art. This allows for manufacturing costs to be reduced, the assembly process to be simplified and the bearing summation and tolerances of the bearing to be minimized. The present hydrodynamic bearing also requires fewer finishing stages after assembly of the individual components than are required in the prior art.

The present hydrodynamic bearing includes a shaft and a bearing sleeve, which encompasses the shaft with a very small radial clearance. The outer surface of the shaft and/or the inner surface of the bearing sleeve, is provided with a plurality of hydrodynamic grooves to form a radial pressure generating area. Thus, a radial bearing is formed between the shaft and the bearing sleeve. The bearing sleeve is constructed as a unitary single piece with a flange, a baseplate or another stationary body component of the DC motor.

For the formation of an axial bearing in accordance with the invention, a pivot bearing is preferably formed between the bottom surface of the bearing sleeve and the bottom of the shaft. In one embodiment of the invention, this bottom surface can be formed by a counter plate which seals one end of the bearing sleeve. Alternatively, the bearing sleeve integrated into the flange is constructed with a closed end face. In the present hydrodynamic bearing, the bearing sleeve has at least one open end from which the shaft protrudes. An annular stopper is preferably fixedly attached to the open end of the bearing sleeve. In the preferred embodiment of the invention, the shaft features a shoulder. A hydrodynamic axial bearing is formed between the opposing surfaces of the shoulder and the stopper. The hydrodynamic axial bearing formed between the shoulder and the stopper is effected as a thrust bearing and takes up axial loads exerted in the direction of the open end of the bearing sleeve. At the same time, the design of this axial bearing in accordance with the invention prevents the shaft from moving out of the bearing sleeve. Axial loads exerted in the opposite direction are taken up by the pivot bearing.

The hydrodynamic bearing constructed in accordance with the present disclosure and claims has minimal dimensions, good axial stiffness and low power loss and can be used when installed in various positions.

In one embodiment of the invention, the stopper can take the form of an annular cap which extends over the open top of the bearing sleeve. The shaft end assigned to the stopper protrudes from the bearing sleeve through a central opening in the stopper. In another embodiment, the stopper is formed as an annular disk which is fitted into the open top of the bearing sleeve.

A groove pattern is formed in the shoulder and/or opposing surface of the stopper to form the hydrodynamic axial bearing. Depending on the construction, one or more groove patterns in particular can be provided on the shaft and/or on the inner surface of the bearing sleeve to form one or more radial bearings.

In one beneficial embodiment of the invention, the shaft end assigned to the stopper protrudes from a central opening in the stopper whereby, between the inner surface of the central opening of the stopper and the shaft, an annular, conical tapered area is formed which is connected by a capillary annular gap to the radial bearing gap between the shaft and the bearing sleeve and forms a so-called capillary seal. The basic principles of such tapered capillary seals are described, for example, in U.S. Pat. No. 5,667,309. The tapered area forms an expansion volume and reservoir which is connected to the radial bearing gap and in which the bearing fluid can be contained when the fluid level rises as temperatures increase. This prevents bearing fluid from escaping the radial bearing gap. In addition, when the bearing fluid evaporates a supply of bearing fluid can be subsequently fed into the bearing gap.

The annular tapered area is preferably formed by tapering the shaft end associated with the stopper or by means of a chamfer in the central, inner opening of the stopper.

In one beneficial embodiment of the invention, the pivot bearing is enclosed by the bearing sleeve. In the location of the pivot bearing, a small groove pattern can be provided on the curved shaft end and/or on the opposing surface of the bearing sleeve to avoid contact between the shaft and bearing sleeve during operation. In addition, the curved shaft end and/or the opposing surface of the bearing sleeve can be given a very hard coating to minimize wear and tear to the shaft as well as to the bearing sleeve when in contact. By forming the second axial bearing as a pivot bearing, the overall power loss for the hydrodynamic bearing is kept down to a minimum.

In forming the grooving on the radial and axial bearings, a large variety of patterns have been suggested, for example, spirals or symmetrical or asymmetrical herring bone patterns.

According to the invention, the overall wall thickness of the bearing sleeve integrated into the flange or the baseplate, depending of the embodiment, is less than 1.2 mm. Where the l/d ratio is less than or equal to 2, the overall wall thickness of the bearing sleeve is preferably less than 0.8 mm. Here, l represents the length of the bearing sleeve measured from the top of the flange to the open end of the bearing sleeve; and d represents the internal diameter of the bearing sleeve.

In another embodiment of the invention, the section of the shaft extending out of the open top of the bearing sleeve has a smaller diameter than the shaft section encompassed by the bearing sleeve and distanced from the open end of the sleeve, wherein the diameter of the enclosed shaft section increases steadily in the direction towards the bottom surface of the bearing sleeve. In particular, this enclosed shaft section and the bearing sleeve encompassing the shaft section are designed complementary to each other so that the bearing sleeve takes up radial and axial bearing loads form the shaft.

The invention also provides for a spindle motor having a hydrodynamic bearing with the type of construction disclosed and claimed herein, as well as a disk drive having such a spindle motor. In one embodiment the extending shaft end can be non-rotatably connected to the spindle motor's hub or fixed into the hub whereby the hub supports storage platters of the disk drive.

To form a hydrodynamic axial bearing, the disclosed and claimed hydrodynamic bearing can be provided with a thrust washer attached non-rotatably to the shaft. The thrust washer interacts with a counter palate in the bearing sleeve to form an axial hydrodynamic thrust bearing.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENTS AND THE DRAWINGS

Figure 1:
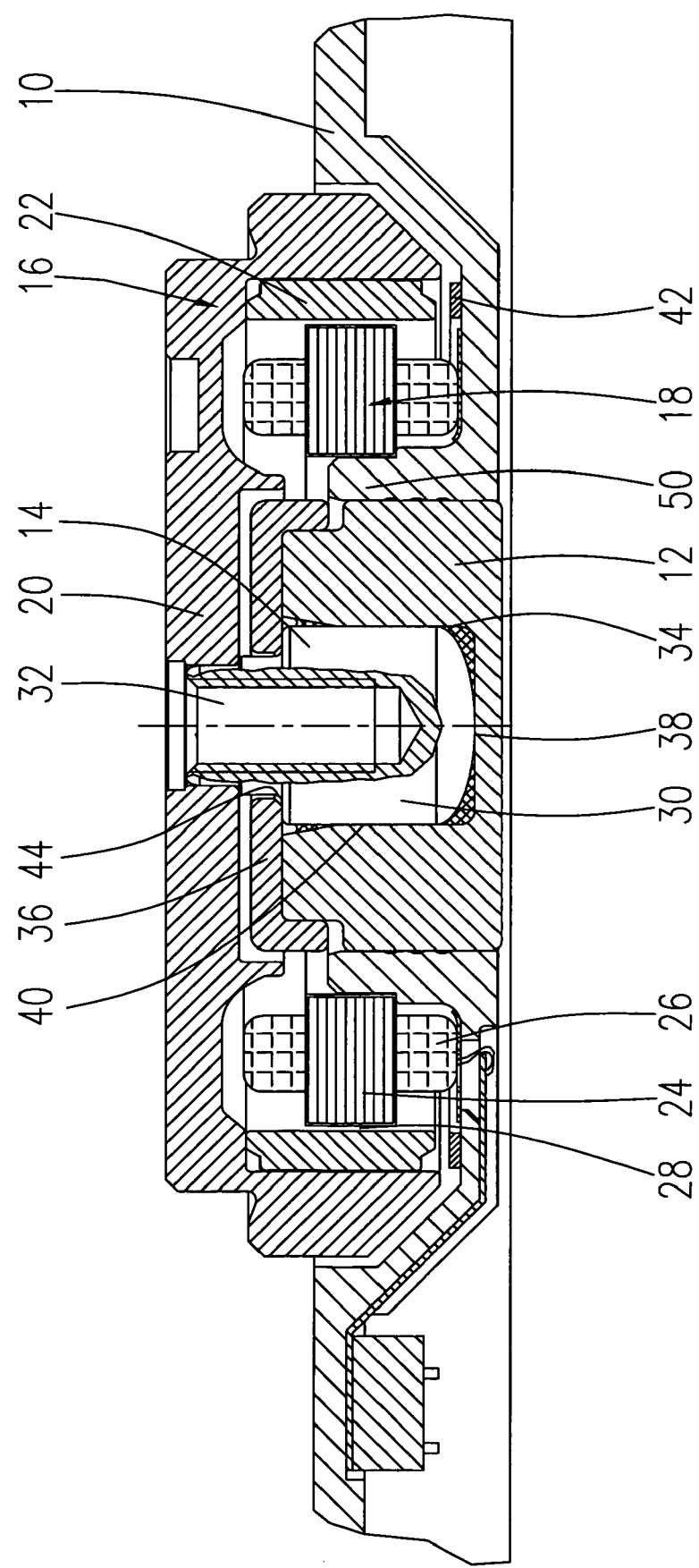
FIG. 1 is a cross-sectional view of a spindle motor with a hydrodynamic bearing explaining the environment in which the invention would be deployed.

The spindle motor shown in FIG. 1 includes a flange or a baseplate 10 for attachment to a disk drive, which is not shown in the figure. The flange 10 is non-rotatably connected to a bearing sleeve 12 for the bearing arrangement of a shaft 14. A rotor 16 is non-rotatably connected to the shaft 14 and rotates in relation to the flange 10 and the bearing sleeve 12. A stator 18 is non-rotatably connected to the flange 10.

The rotor 16 consists of a hub 20 and a shaft 14 which is fixed at the center of the hub 20. A rotor magnet 22 is connected to the inside peripheral wall of the hub 20, e.g. pressed into it or bonded onto it. The outside of the hub's peripheral wall is shaped in such a way that it can hold one or several magnetic disks (not illustrated).

The stator 18 consists of a stack 24 and stator windings 26 which are coiled around the stack 24. The stator 18 and the rotor 16 or the annular permanent magnet 22 attached to the hub 20 are separated from each other by a small concentric gap, the air gap 28.

The shaft 14 comprises two sections, a shaft section 30 with a larger diameter and a shaft section 32 with a smaller diameter. The bearing sleeve 12 is a cylindrical component in which a cylindrical bore 34 is formed to accommodate the shaft 14. The part of the cylindrical bore 34 at the open end of the bearing sleeve 12 has a slightly increasing radius in order to form an annular, conical tapered area between the inner surface of the bearing sleeve 12 and the shaft 14, thus forming a so-called tapered capillary seal.

A cap 36 is provided at the open end of the bearing sleeve 12 extending over the bearing sleeve 12. The cap 36 is annular and has a central, inner opening with a smaller radius than the cylindrical bore 34. The shaft section 32 extends through the central inner opening of the cap 36. Further the diameter of the inner opening of the cap 36 is smaller than the diameter of the shaft's larger diameter section 30. Thus, sides of the cap 36 overlap with the step formed between the two sections of the shaft preventing the shaft 14 from moving out of the bearing sleeve 12 when the spindle motor is subjected to shock or is operated having been installed in a reverse position.

The shaft 14 is accommodated in the cylindrical bore 34 of the bearing sleeve 12. The part of the shaft 14 which is inserted into the cylindrical bore 34 includes the shaft section 30 with the larger diameter. A curved end surface is formed at the end of the shaft 38 enclosed by the bearing sleeve 12. One or both of the curved end surface and the opposing inner surface of the bearing sleeve 12 can be provided with grooving to prevent these surfaces from contacting each other during operation.

The radial bearing gap 40 between the bearing sleeve 12 and the shaft 14 is filled with a bearing fluid, particularly a lubricating oil. Radial pressure generating grooving is formed either on the outer surface of the shaft 14, particularly the shaft section 30 with a larger diameter, or on the inner surface of the bearing sleeve 12 in order to form a radial bearing. One or more groups of grooves can be provided to form one or more radial bearings, as required.

A shoulder or step 44 is formed in the shaft 14 between the shaft section 30 with a larger diameter and the shaft section 32 with a smaller diameter. The shoulder 44 interacts with the cap 36 to prevent the shaft from falling out of the bearing sleeve. A hydrodynamic axial bearing may be formed between the opposing surfaces of the cap 36 acting as a stopper and the shoulder 44 in the shaft 14. Hydrodynamic pressure generating grooves can be formed in these opposing surfaces in order to form the axial bearing. This axial bearing can be formed with minimal contact surfaces as a supporting or supplementary bearing.

A pre-loaded back yoke 42 is attached to the flange 10. The pre-loaded back yoke 42 interacts with the rotor magnet 22 to exert a force on the rotor 16 which pulls the rotor 16 in the direction of the flange 10.

As shown in FIG. 1, the bearing sleeve 12 is held in a flange sleeve 50 so that an overall wall thickness consists of the wall thicknesses of the bearing sleeve 12 and the flange sleeve 50.

To miniaturize hydrodynamic bearings, the invention provides for the bearing sleeve to be integrated as a single piece into the flange, a baseplate of the spindle motor or suchlike. Preferred embodiments of various assemblies for a spindle motor with hydrodynamic bearings in accordance with the invention are shown in FIGS. 2–5. Further elements of the spindle motor such as the rotor and stator can be constructed in a manner similar to that shown in FIG. 1, wherein FIG. 1 only illustrates one possible example for the construction of a spindle motor and the invention is not limited to this construction.

Figure 2:
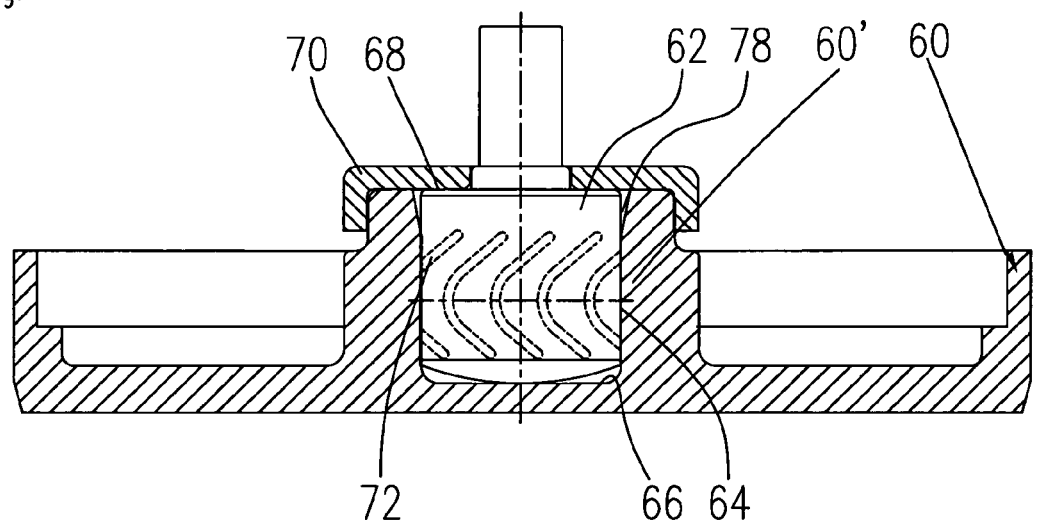
FIG. 2 is a cross-sectional view of an assembly for a spindle motor with a hydrodynamic bearing in accordance with a first embodiment of the invention.

FIG. 2 shows an assembly for a spindle motor with a hydrodynamic bearing in accordance with a first embodiment of the invention. The assembly consists of a flange 60 with an integrated bearing sleeve 60' which encompasses a shaft 62 with a small radial clearance forming an air gap 64. One end of the shaft 62 is enclosed by the flange 60. This enclosed end of the shaft and its opposing inner surface 66 form a pivot bearing. At its other end, the shaft 62 protrudes from the open top of the bearing sleeve 60' of the flange 60. The shaft 62 features a step or a shoulder 68 overlapping with a stopper 70 to prevent the shaft from falling out of the sleeve. In the embodiment shown in FIG. 2, the stopper 70 is formed as a cap for the open top of the bearing sleeve 60'.

A radial bearing is formed by the illustrated grooving 72 on the outer surface of the shaft 62 or on the inner surface of the bearing sleeve 60'. To form a hydrodynamic axial bearing, grooving is also provided on the shoulder 68 of the shaft 62 and/or the opposing surface of the stopper 70. The axial bearing formed between the shoulder 68 and the stopper 70 acts as an auxiliary bearing to take up axial loads which are opposed to the loads that act on the pivot bearing. The illustrated construction enables a spindle motor to be operated in various installed positions. When assembled, the motor of course has further rotor and stator components, as shown for example in FIG. 1.

Figure 3:
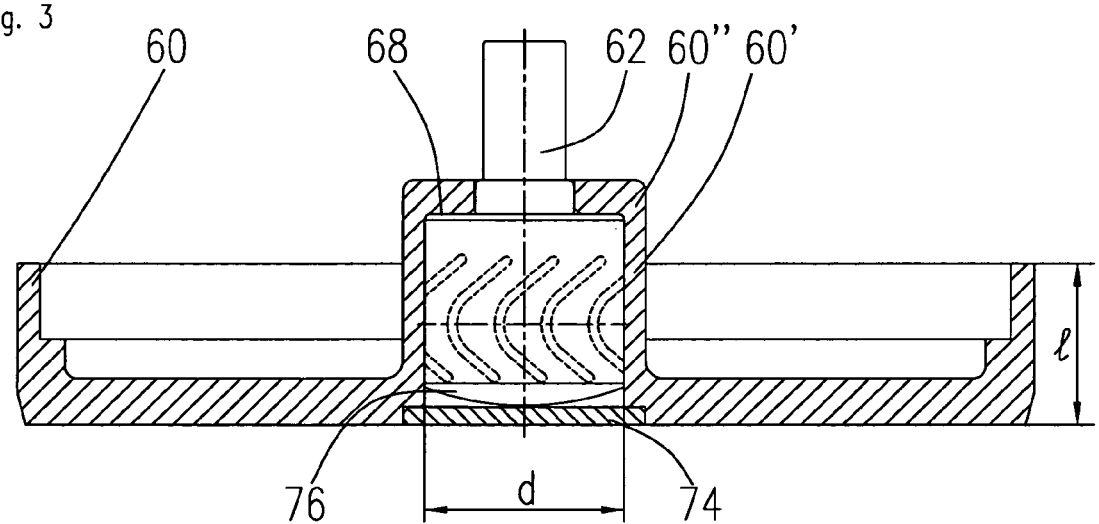
FIG. 3 is a cross-sectional view of an assembly for a spindle motor with a hydrodynamic bearing in accordance with a second embodiment of the invention.

FIG. 3 shows a modification of the hydrodynamic bearing of FIG. 2. As in FIG. 2, a flange 60 is formed as a single piece with a bearing sleeve 60'. The bearing sleeve 60' encompasses a shaft 62 with a small radial clearance. The shaft 62 features a shoulder 68 at the shaft's end which protrudes from the open top of the bearing sleeve 60'. At this end face, the bearing sleeve 60' of the flange 60 is provided with a stopper 60" which lies opposite the shoulder 68 and encloses the shaft 62. The stopper 60" is formed by an end section of the bearing sleeve 60' with a smaller diameter of its central opening. Hydrodynamic pressure generating grooves can again be provided on the opposing surfaces of the shoulder 68 and the stopper 60" to form a hydrodynamic axial bearing.

The shaft is inserted into the bearing sleeve 60' through its bottom opening. The bottom opening of the bearing sleeve 60' is then sealed by a counter plate 74. A bottom end 76 of the shaft 62 and the counter plate 74 form a pivot bearing as described with reference to FIGS. 1 and 2. In both embodiments shown in FIG. 2 and FIG. 3, a further groove pattern can be formed on the curved shaft end 76 and/or on the opposing surface of the bearing sleeve 60' (FIG. 2) or the counter plate 74 (FIG. 3) to avoid or to minimize material contact in the area of the pivot bearing during operation.

In both embodiments shown in FIGS. 2 and 3, a concentric, tapered area 78 can be formed between the shaft 62 and the bearing sleeve 60' in the area at the open end of the bearing sleeve 60'. Tapered area 78 forms a tapered capillary seal, as described above with reference to FIG. 1. In the figures, the tapered capillary seal is illustrated only in FIG. 2.

The embodiments shown are particularly suitable for very small spindle motors for disk drives with form factors of 2.5 inches, 1.8 inches and less.

Using the construction shown in FIGS. 2 and 3 (as well as the construction described below with reference to FIGS. 4 and 5), it is possible to construct a spindle motor with a hydrodynamic bearing which requires less components. This allows costs to be reduced and the assembly process to be simplified. Furthermore, fewer finishing stages are also required.

In addition the construction illustrated herein allows for a substantial gain of space within the motor. In the embodiment shown, the bearing sleeve 60' integrated into the flange 60 has a wall thickness of some 1.0 mm or less. For a hydrodynamic bearing having an l/d≦2, the overall wall thickness of the bearing sleeve integrated into the flange is preferably less than 0.8 mm. Here, l represents the length of the bearing sleeve measured from the top of the flange and d represents the internal diameter of the bearing sleeve, as shown in FIG. 3.

It is practically impossible to construct a hydrodynamic bearing having the above reduced wall thicknesses, where the bearing sleeve and the flange are a two-piece construction. The presently disclosed and claimed construction increases the usability of hydrodynamic bearings in spindle motors with very small dimensions.

Figure 4:
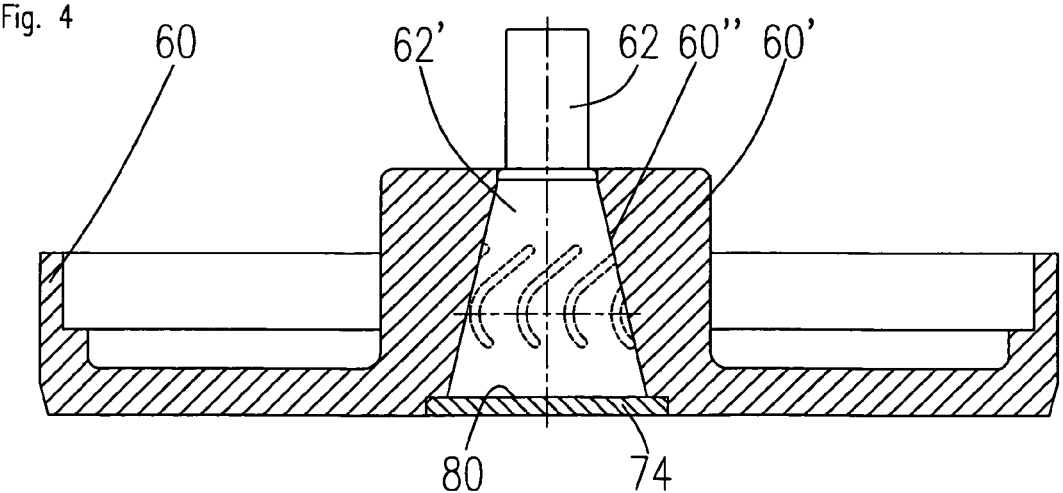
FIG. 4 is a cross-sectional view of an assembly for a spindle motor with a hydrodynamic bearing in accordance with a third embodiment of the invention.

Another embodiment of the bearing presented in the invention is shown in FIG. 4. FIG. 4 shows a flange 60 with an integrated bearing sleeve 60'. The bearing sleeve 60' encompasses the shaft 62 with a small radial clearance. Sleeve's inner surface facing the shaft forms a stopper 60" which work together with the shaft 62 to prevent the shaft from falling out of the bearing sleeve. The shaft 62 features a conical part 62' which extends form the open top of the bearing sleeve 60' to the counter plate 74. The inner contour of the bearing sleeve 60' is formed in a manner complementary to the shaft 62 having this shape. Through grooving on the conical part 62' of the shaft 62 and/or on the inside of the bearing sleeve 60', a hydrodynamic bearing is formed which can take up both a radial as well as an axial load component.

In the embodiment shown, the bearing sleeve features a cone-like recess in which a shaft end shaped in a roughly complementary fashion is accommodated. The complementary shapes of the inner area of the bearing sleeve and the shaft end held within the sleeve give mechanical stability to the shaft in the bearing sleeve in a radial and axial direction. The cone-like recess inside the bearing sleeve also prevents the shaft from being axially moved out of the sleeve. Axial load in the opposite direction is taken up by the stopper formed in the bearing sleeve.

The recess in the bearing sleeve and the associated shaft end are formed in such a way that the bearing sleeve takes up both radial and axial bearing loads. By changing the shape of the recess and the shaft end, in particular by changing the gradient or the curvature of the inside walls of the recess or the outer surface of the shaft, the axial and radial loads, which are taken up by the bearing, can be adapted to the respective marginal conditions.

In the hydrodynamic bearing shown in FIG. 4, additional radial or axial bearings, alongside those described above, are not required. However one or more radial bearings can be provided on the straight section of the shaft if additional horizontal stabilization is required.

In the embodiment shown in FIG. 4, the shaft 62 features a flat plane end face 80 which together with the opposing surface of the counter plate 74 forms a hydrodynamic axial thrust bearing. For this purpose, appropriate grooving on the end face 80 and/or the opposing surface of the counter plate 74 can be provided. Axial loads exerted in the opposite direction are taken up by the inclined inner surface 60" of the bearing sleeve 60' which acts as a stopper.

As an alternative, a pivot bearing can also be formed at the end of the shaft 62.

The hydrodynamic bearing shown in FIG. 4 is also particularly suitable for very small spindle motor applications, in particular for disk drives with a form factor of 2.5 inches or less. Integrating the bearing sleeve into the flange results in the improved use of space since the material thickness for the bearing sleeve and the support for the bearing sleeve in the flange is reduced. Furthermore, forming the bearing sleeve as an integral part of the flange results in fewer components being utilized, an advantage for assembly work and tolerance conformity.

Figure 5:
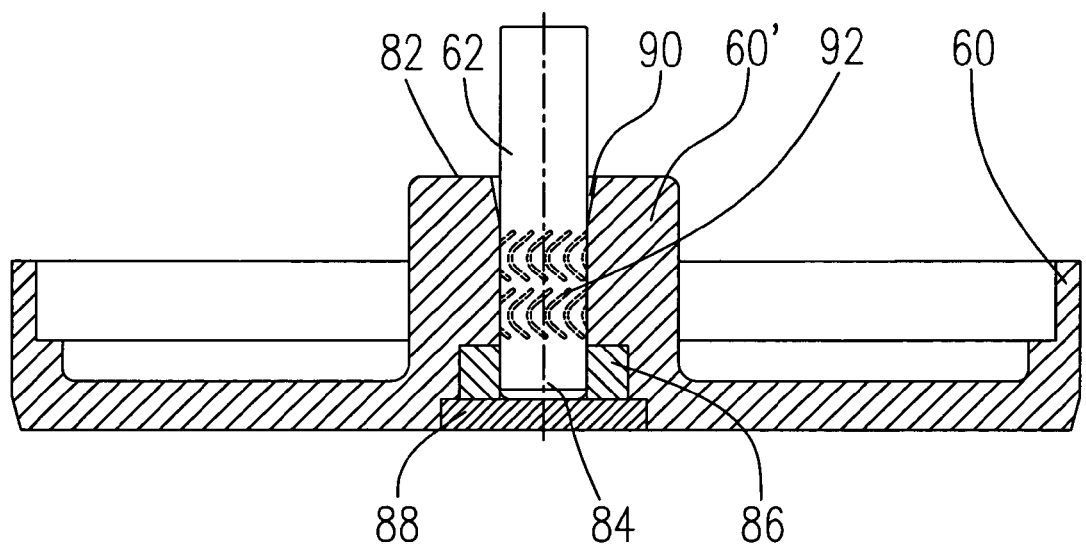
FIG. 5 is a cross-sectional view of an assembly for a spindle motor with a hydrodynamic bearing in accordance with a fourth embodiment of the invention.

Finally, FIG. 5 shows an assembly for a spindle motor with a hydrodynamic bearing in accordance with a fourth embodiment of the invention. FIG. 5 shows a flange 60 with an integrated bearing sleeve 60'. The bearing sleeve 60' encompasses the shaft 62 with a small radial clearance. The shaft 62 protrudes from the open top 82 of the bearing sleeve 60'. At the shaft bottom 84 enclosed by the bearing sleeve 60', a thrust washer is fixedly mounted on the shaft 62. The thrust washer together with a counter plate 88 forms an axial thrust bearing, as is generally known in the art. The thrust washer also secures the shaft 62 against an axial shift within the bearing sleeve 60'. At the open top 82 of the bearing sleeve 60', in the embodiment shown in FIG. 5, an annular, tapered area 90 is formed between the inner surface of the bearing sleeve 60' and the shaft 62 thus forming a tapered capillary seal. Any other known capillary seal can be used with the present invention.

In the embodiment shown in FIG. 5, the wall thickness of the bearing sleeve 60' can, at least in part, be less than 1.0 mm and can be further reduced to about 0.5 mm locally. On the inner surface of the bearing sleeve 60' or on the outer surface of the shaft 62, one or more groove patterns 92 can be provided to create a radial pressure generating area for the hydrodynamic radial bearing.

The embodiments shown in FIGS. 2–5 are particularly characterized in that the bearing sleeve of the hydrodynamic bearing is integrated in a flange or a baseplate, a frame or any other support for the motor, in other words, it forms a single piece with the support element. Pressure generating grooves of the hydrodynamic bearing can be formed in the bearing sleeve integrated into the flange or the baseplate etc. Consequently, a separate bearing sleeve is not required resulting in the reduced number of components, lower costs and reduced assembly work. At the same time, where no separate bearing sleeve is required, there is more space inside the motor. The hydrodynamic bearing can then be used in small-scale spindle motors.

The flange can be made, for example, from aluminum or steel and be given a hard coating in the area of the bearing.

The design of the hydrodynamic bearing used in the invention enables the spindle motor to be operated in any installed position desired, whereby radial and axial bearing loads can be taken up in every installed position. At the same time, the invention provides a hydrodynamic bearing which has a minimum axial length and sufficient axial stiffness so that it can be used, for example, in miniature disk drives.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A hydrodynamic bearing assembly comprising:
    a rotational shaft;
    a stationary flange including a bearing sleeve portion encompassing the rotational shaft with a small radial clearance such that an inner surface of the bearing sleeve portion is located immediately adjacently to an outer surface of the rotational shaft, said bearing sleeve portion having a partially enclosed end and an open end;
    a radial bearing formed between the inner surface of the bearing sleeve portion and the outer surface of the rotational shaft, the radial bearing comprising a plurality of hydrodynamic pressure generating grooves formed on at least one of the outer surface of the rotational shaft and the inner surface of the bearing sleeve portion;
    a counter plate enclosing the open end of the bearing sleeve portion; and
    a thrust bearing formed between an upper surface of the counter plate and a bottom surface of the rotational shaft,
    wherein the bearing sleeve portion is constructed as a single, seamless and integral component of the stationary flange, wherein an upward movement of the rotational shaft is prevented by the partially enclosed end of the bearing sleeve portion and wherein no part of the bearing sleeve portion is located below a bottom surface of the stationary flange.

2. The hydrodynamic bearing assembly according to claim 1, wherein said thrust bearing is a pivot bearing.

3. The hydrodynamic bearing assembly according to claim 1, wherein a wall thickness of the bearing sleeve portion is less than 1.0 mm.

4. The hydrodynamic bearing assembly according to claim 1, wherein a partial wall thickness of the bearing sleeve portion is less than 1.0 mm.

5. The hydrodynamic bearing assembly according to claim 1, wherein a wall thickness of the bearing sleeve portion is less than 0.5 mm.

6. The hydrodynamic bearing assembly according to claim 1, wherein a partial wall thickness of the bearing sleeve portion is less than 0.5 mm.

7. The hydrodynamic bearing assembly according to claim 1, wherein a diameter of the rotational shaft increases steadily towards a counter plate at a bottom of the bearing sleeve portion, so that the bearing sleeve portion receives both radial and axial load components from the shaft.

8. A spindle motor having a hydrodynamic bearing, said bearing comprising:
    a rotational shaft;
    a stationary flange including a bearing sleeve portion encompassing the rotational shaft with a small radial clearance such that an inner surface of the bearing sleeve portion is located immediately adjacently to an outer surface of the rotational shaft, said bearing sleeve portion having a partially enclosed end and an open end;
    a radial bearing formed between the inner surface of the bearing sleeve portion and the outer surface of the rotational shaft, the radial bearing comprising a plurality of hydrodynamic pressure generating grooves formed on at least one of the outer surface of the rotational shaft and the inner surface of the bearing sleeve portion;
    a counter plate enclosing the open end of the bearing sleeve portion; and
    a thrust bearing formed between an upper surface of the counter plate and a bottom surface of the rotational shaft,
    wherein the bearing sleeve portion is constructed as a single, seamless and integral component of the stationary flange and wherein an upward movement of the rotational shaft is prevented by the partially enclosed end of the bearing sleeve portion.

9. A disk drive with a spindle motor having a hydrodynamic bearing, said bearing comprising:
    a rotational shaft;
    a stationary flange including a bearing sleeve portion encompassing the rotational shaft with a small radial clearance such that an inner surface of the bearing sleeve portion is located immediately adjacently to an outer surface of the rotational shaft, said bearing sleeve portion having a partially enclosed end and an open end;

a radial bearing formed between the inner surface of the bearing sleeve portion and the outer surface of the rotational shaft, the radial bearing comprising a plurality of hydrodynamic pressure generating grooves formed on at least one of the outer surface of the rotational shaft and the inner surface of the bearing sleeve portion;

a counter plate enclosing the open end of the bearing sleeve portion; and a thrust bearing formed between an upper surface of the counter plate and a bottom surface of the rotational shaft, wherein the bearing sleeve portion is constructed as a single, seamless and integral component of the stationary flange and wherein an upward movement of the rotational shaft is prevented by the partially enclosed end of the bearing sleeve portion.

\* \* \* \* \*